United States Patent
Hazra

(10) Patent No.: US 6,178,204 B1
(45) Date of Patent: *Jan. 23, 2001

(54) ADAPTIVE CONTROL OF VIDEO ENCODER'S BIT ALLOCATION BASED ON USER-SELECTED REGION-OF-INTEREST INDICATION FEEDBACK FROM VIDEO DECODER

(75) Inventor: Rajeeb Hazra, Beaverton, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/052,493

(22) Filed: Mar. 30, 1998

(51) Int. Cl.$^7$ ................. H04N 7/12; G06T 1/00
(52) U.S. Cl. .............. 375/240.25; 345/342; 382/293
(58) Field of Search ....................... 348/384, 390, 348/571, 576, 581; 345/342–344, 428; 382/293, 298–299; 375/240.25, 240.03

(56) References Cited

U.S. PATENT DOCUMENTS

| | | | |
|---|---|---|---|
| 5,335,296 | * 8/1994 | Larkin et al. | 382/298 |
| 5,598,209 | * 1/1997 | Cortjens et al. | 348/211 |
| 5,600,373 | * 2/1997 | Chui et al. | 348/397 |
| 5,621,429 | * 4/1997 | Yamaashi et al. | 345/119 |
| 5,793,379 | * 8/1998 | Lapidous | 345/439 |
| 5,880,728 | * 3/1999 | Yamaashi et al. | 345/343 |
| 5,990,940 | * 11/1999 | Hashimoto et al. | 348/184 |

FOREIGN PATENT DOCUMENTS

| | | | |
|---|---|---|---|
| 4006324622 | * 11/1994 | (JP) | G09G/5/14 |
| 407327151 | * 12/1995 | (JP) | H04N/5/205 |
| 410023375 | * 1/1998 | (JP) | H04N/7/01 |

OTHER PUBLICATIONS

Wei et al, "A Universal High Performance Digital Performance Television Controller", IEEE Transactions on Consumer Electronics, vol. 36, iss. 3, published Aug. 1990.*

Harrand et al, "A Single Chip Videophone Encoder/Decoder", IEEE International 41st ISSCC, published Feb. 1995.*

International Telecommunication Union H.323, "Visual Telephone Systems and Equipment for Local Area Networks Which Provide A Non–Guaranteed Quality of Service", p. 11, May 28, 1996.

International Telecommunication Union H.261, "Video Codec for Audiovisual Services at P+64 kbits", p. 5, Mar. 1993.

International Telecommunication Union H.320, "Narrow–Band Visual Telephone Systems and Terminal Equipment", Mar. 1993.

International Telecommunication Union H.324, "Terminal for low bit rate Multimedia Communication", Mar. 1996.

* cited by examiner

Primary Examiner—Vu Le
(74) Attorney, Agent, or Firm—Gene Su

(57) ABSTRACT

A method and apparatus for displaying a user selected region-of-interest clearly on a video display terminal in an audiovisual conferencing system is disclosed. The method comprising the steps of having a user select his or her region-of-interest on a display terminal with an input device, having the video decoder translate the user's selection to corresponding horizontal and vertical coordinates recognizable both by the video decoder and the video encoder, having the video decoder transmit the coordinates to the video encoder through a back transmission channel, and having the video encoder allocate bits originally for representing compressed video information outside the region-of-interest to represent compressed video information within the interested region of images and transmit the compressed video information to the video decoder through a forward transmission channel.

13 Claims, 8 Drawing Sheets

T   Transform
Q   Quantizer
P   Picture memory with motion compensated variable delay
F   Loop filter
CC  Coding control
p   Flag for INTRA/INTER
t   Flag for transmitted or not
qz  Quantizer indication
q   Quantizing index for transform coefficients
v   Motion vector
f   Switching on/off of the loop filter

ADAPTIVE CONTROL OF VIDEO ENCODER'S BIT ALLOCATION BASED ON USER-SELECTED REGION-OF-INTEREST INDICATION FEEDBACK FROM VIDEO DECODER

FIELD OF THE INVENTION

This invention relates to image signal processing generally and particularly to systems for providing compressed digital video signals representative of a full color video signal.

BACKGROUND OF THE INVENTION

Image data compression is concerned with minimizing the number of bits required to represent an image. Some of the well-known methods are in the areas of pixel coding, predictive coding and transform coding.

Although image compression methods or systems exploit redundancy in the image data and attempt to pack large amount of information into a small number of samples, they often lack the intelligence to determine which object in a particular image needs to be displayed clearly. Such intelligence is important in today's commonly used audiovisual conferencing systems due to these systems' inherent cost and bandwidth constraints. More specifically, many of the audiovisual conferencing systems are based on International Telecommunication Union (ITU) standards such as H.320, published in March, 1993, H.324, published in January, 1996 or H.323, published May, 1996 and thrive on being affordable and operable on a personal computer systems. Consequently, the video compression and decompression schemes in these standards do not require as intensive computation and elaborate buffering mechanism as other more advanced image compression methods. Thus, the resulting images are often not distinctly sharp. Moreover, the line speeds to these said conferencing systems often range in the 20 kps to 384 kps. Because of the limited number of data bits available for compressing and transmitting video information, the processed images frequently lack clarity and suffer low frame rates.

Low image quality has hampered the uses of these conferencing systems. For example, a patent attorney may have trouble seeing drawings on a scientist's white board through an audiovisual conference. Similarly, a telecommuter may have trouble viewing the agenda being displayed on the conference room's projector screen. In order to overcome these problems without violating the same aforementioned cost and bandwidth constraints, an apparatus and method is needed to allow an user to select a region-of-interest and display said region with as much clarity as possible under the circumstances.

SUMMARY OF THE INVENTION

An improved method and apparatus for generating a user selected region-of-interest in detail is disclosed. In one embodiment, after a user has selected a region-of-interest, a video decoder in the system translates the selected region to correspond to horizontal and vertical coordinates recognizable both by the system's video decoder and the video encoder. Then the video decoder transmits the coordinates to the video encoder. After the video encoder receives the coordinates, the encoder allocates bits originally for representing compressed video information outside the coordinates to represent compressed video information within the coordinates.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

An apparatus and method for allowing a user to select a region-of-interest and displaying said region with as much clarity as possible under the circumstances is described. In the following description, numerous specific details are set forth such as video compression/decompression schemes, quantizers, etc. in order to provide a thorough understanding of the present invention. However, it will be apparent to one of ordinary skill in the art that the invention may be practiced without these particular details. In other instances, well known elements and theories such as transform coding, bit allocation algorithms, quantization, etc. have not been described in special detail in order to avoid unnecessarily obscuring the present invention.

Figure 1:
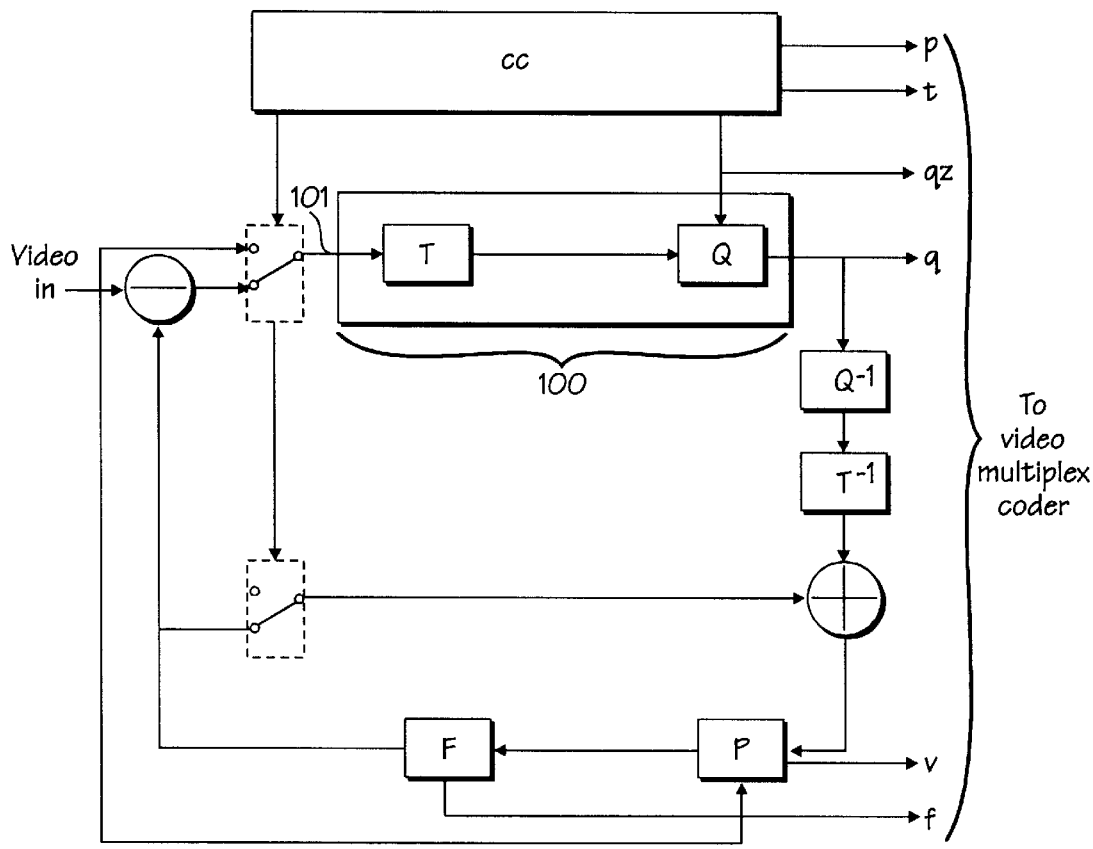
FIG. 1 illustrates a video encoder based on ITU H.261 Recommendation.
Figure 2:
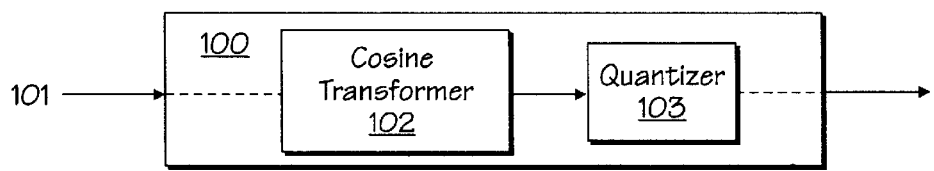
FIG. 2 illustrates some details of the transform coder in FIG. 1.

FIG. 1 illustrates a block diagram of a prior art video source coder (ITU H.261 Recommendation, published March, 1993). FIG. 2 focuses in on the pertinent blocks of FIG. 1 for the purpose of discussing the present invention. In particular, block 100 is marked in FIG. 1 and further expanded and illustrated in FIG. 2. Block 100's functionality is to process video input signal 101 using modules such as cosine transformer 102 and quantizer 103. Transformer 102 performs two-dimensional discrete cosine transforms on input video signal 101. Then quantizer 103 linearly quantizes the output of transformer 102, or its transformed coefficients, with a predetermined step size.

Figure 3:
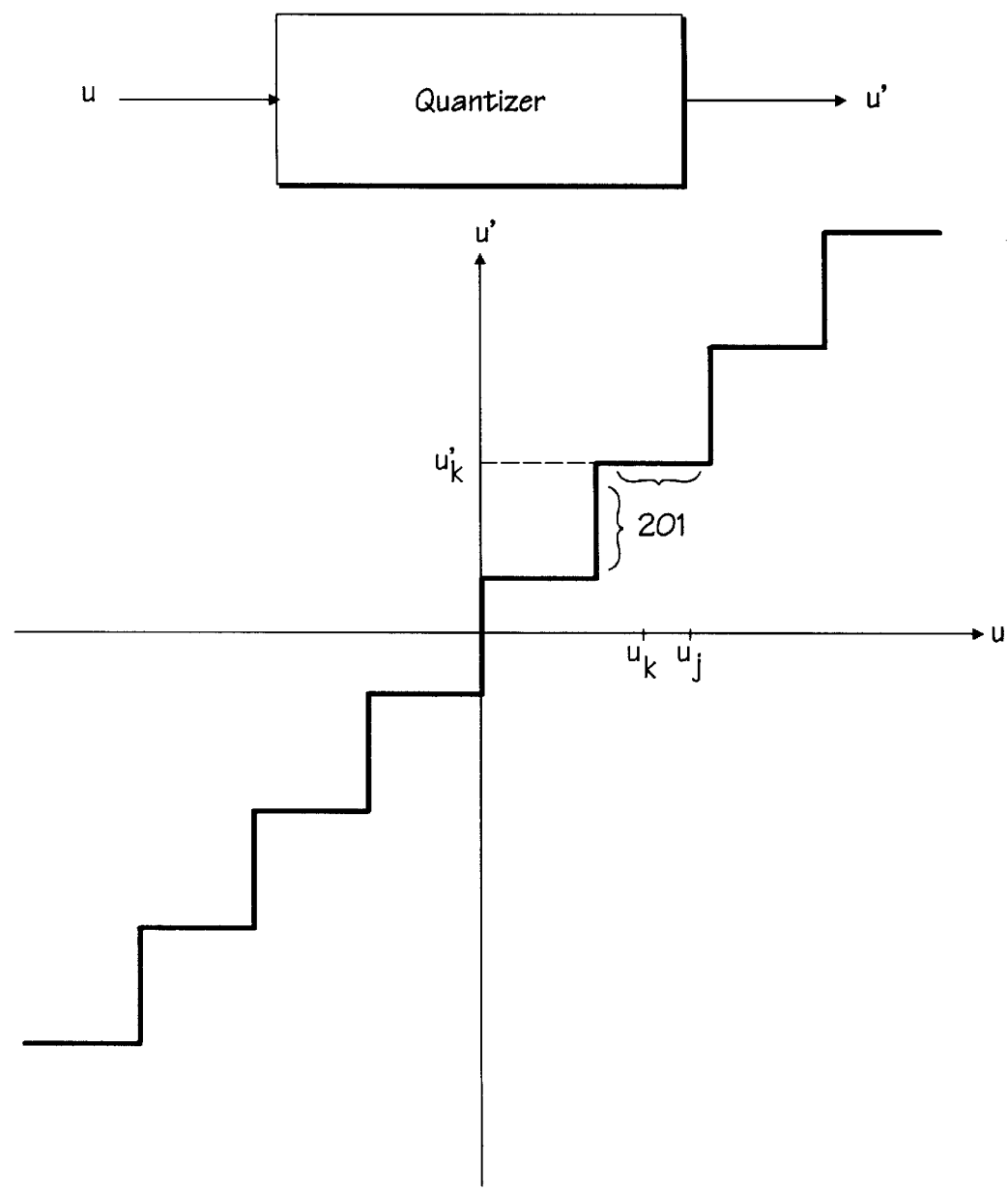
FIG. 3 illustrates an example of a quantizer.

The theory behind transform coding is that a large fraction of the total energy is packed in a relatively few transformed coefficients. Because these coefficients are later quantized independently to provide further data reduction, an optimal transform coder minimizes the overall distortion generated by the quantizer. FIG. 3 illustrates a simple quantizer. The quantizer maps a continuous variable u into a discrete variable u'. For example, if $u=U_k$, the corresponding quantized output is $u'_k$. However, if $u=u_j$, the corresponding output is still $u'_k$. As has been demonstrated, a given quantizer output does not uniquely map to one input value. This difference between the input and output values introduces distortion. On the other hand, if quantizer step size 201 becomes smaller, the more accurately input value u will map to output value u' and result in reduced distortion. Unfortunately, introducing more quantizer steps equals requiring more data bits and more computational capabilities to process those bits.

Figure 4:
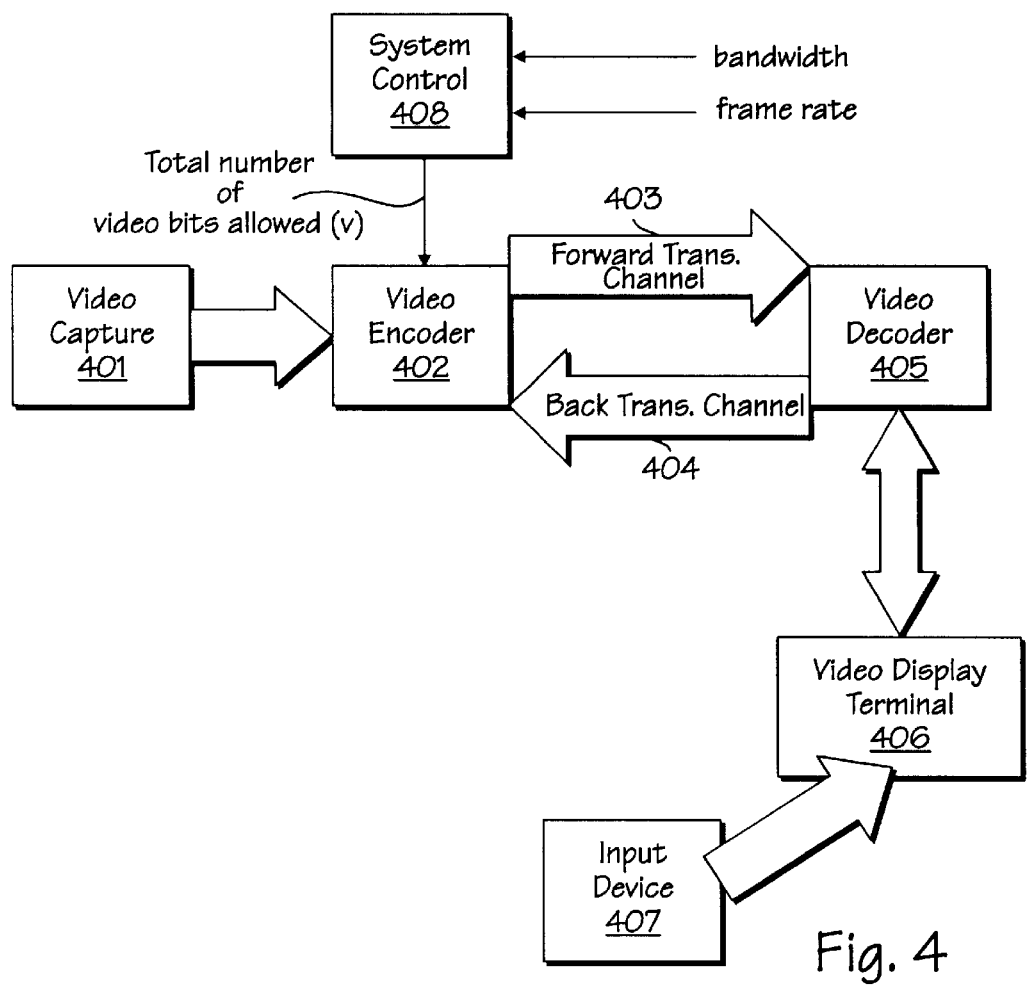
FIG. 4 illustrates the block diagram of one embodiment of the present invention.
Figure 6:
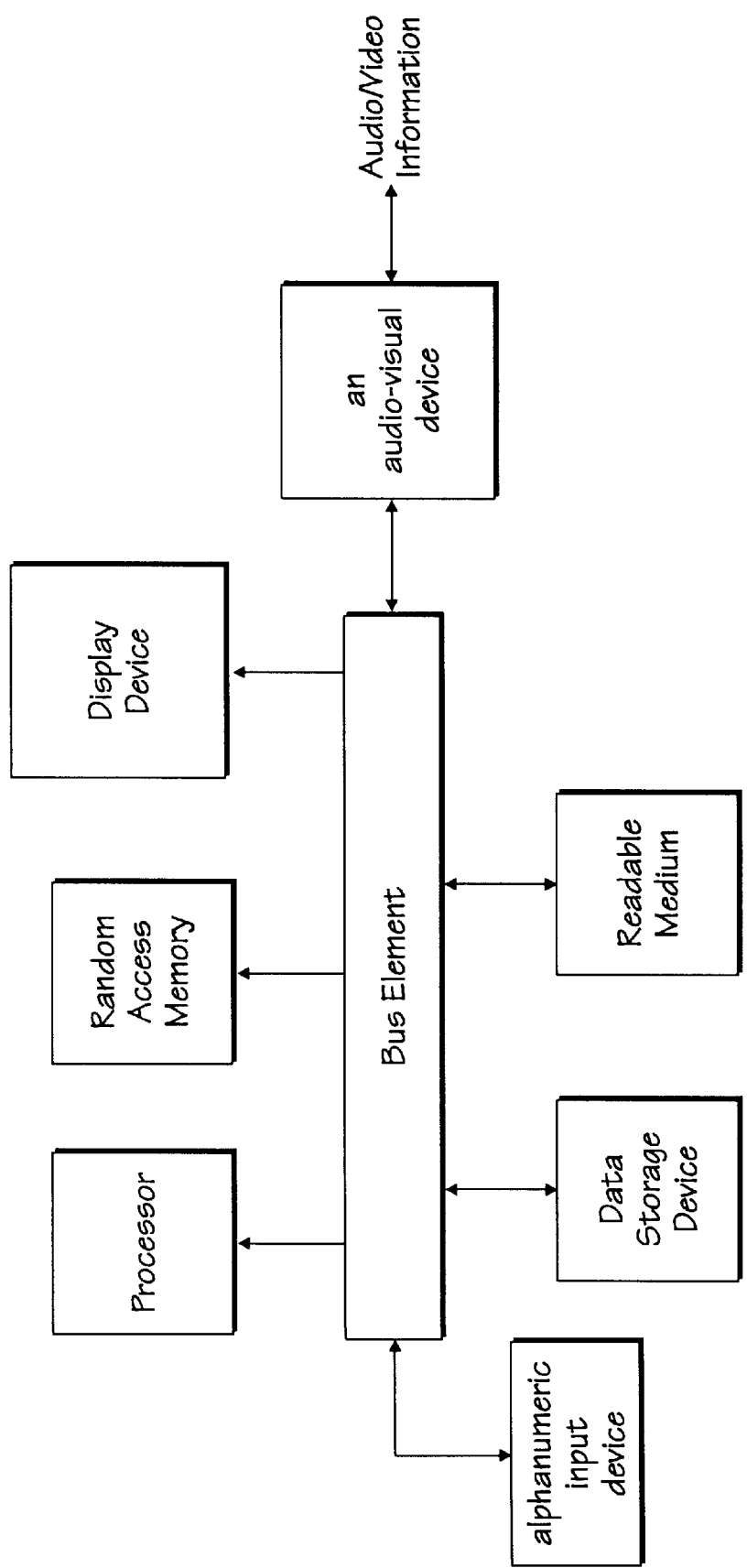
FIG. 6 illustrates a general purpose computer system architecture.

It should be noted that FIG. 4 illustrates the block diagram for the invention at hand having been programmed or implemented in various types of systems. One example of the preferred embodiment for the present invention is on a general purpose computer system as illustrated in FIG. 6. Such a computer system architecture comprises a bus element for communicating information, a processor coupled with said bus element for processing audio and video information, a random access memory coupled with said bus element for storing static information and instructions for said processor, a data storage device such as a magnetic disk and disk drive coupled with said bus element for storing information and instructions, a readable medium such as a floppy disk or a CD coupled with said bus element for retrieving information and instructions for said processor, an audiovisual device coupled to said bus element for capturing video and audio information, a display device coupled to said bus element for displaying information to the computer user and an alphanumeric input device coupled to said bus element for communicating information and command selections to said processor.

Figure 7:
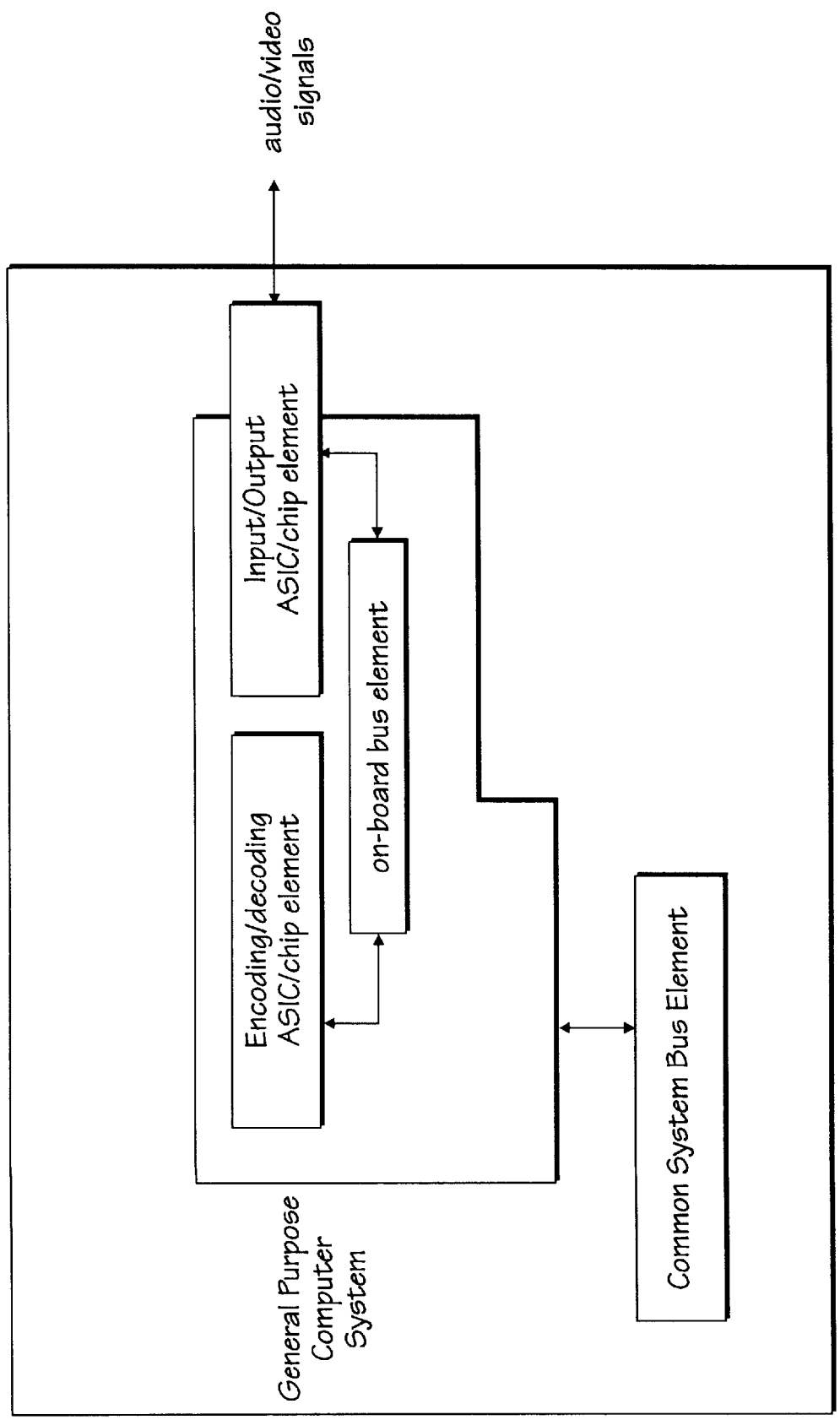
FIG. 7 illustrates an add-on board in a general purpose computer system.

An alternative embodiment for the present invention is an add-on circuit board to a general purpose computer system as illustrated in FIG. 7. The circuit board comprises an on-board bus element for communicating information, dedicated Application Specific Integrated Circuits (ASICs) and chip elements coupled with said bus element for encoding and decoding audio and video information, and other ASICs and chip elements coupled to said bus element for handling the input and the output of audio and video signals. This add-on board is further coupled with the common system bus element in the general purpose computer system.

Yet another alternative embodiment for the present invention is a dedicated audiovisual conferencing system. This type of conferencing system often uses a combination of dedicated hardware components or general purpose processors programmed with particular execution sequences to manage receiving, processing and transmitting audio and video information. Although this embodiment comprises many of the same elements as the general purpose computer system illustrated in FIG. 6, it frequently does not offer anything other than the audiovisual conferencing capability.

Despite having disclosed various types of systems above, it will be apparent to one of the ordinary skill in the art that the present invention may appear in other system configurations without exceeding the scope of the present invention.

Operation of the Present Invention

The invention at hand is an apparatus or method for allowing a user to select a region-of-interest, displaying said region with much clarity and at the same time satisfying certain cost and bandwidth constraints. The basic premise of the invention is to allot the system resources, such as the central processing unit's computation cycles and video channel bandwidth, to users' regions-of-interest in a two dimensional image. More specifically, this reallocation scheme consists of two fundamental steps: 1) defining the region-of-interest and 2) allocating available bits from areas outside region-of-interest to region-of-interest.

Figure 8:
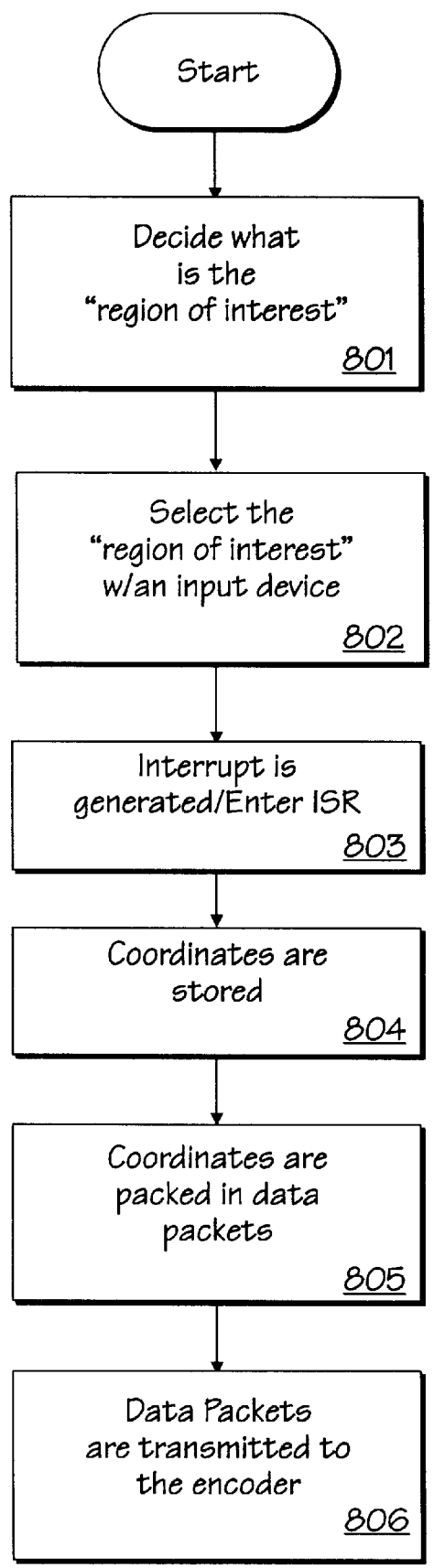
FIG. 8 illustrates a flow chart describing the process of identifying the region-of-interest in the present invention.
Figure 9:
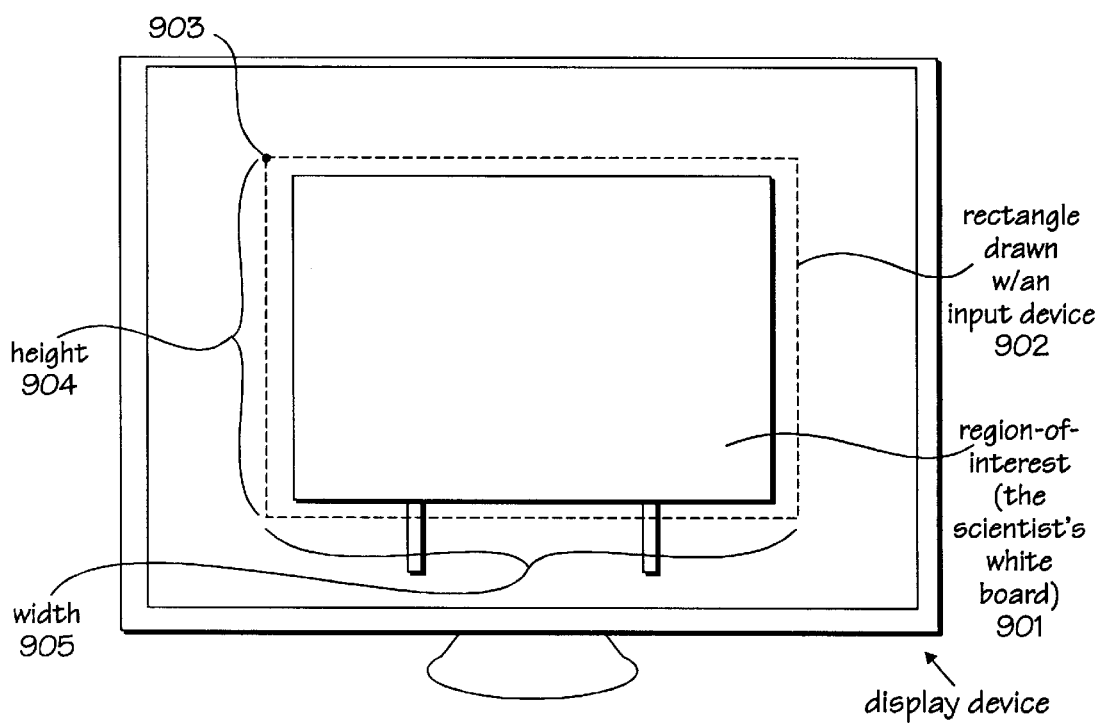
FIG. 9 illustrates one example of the geometric relationships between a drawn rectangle and the region-of-interest
Figure 10:
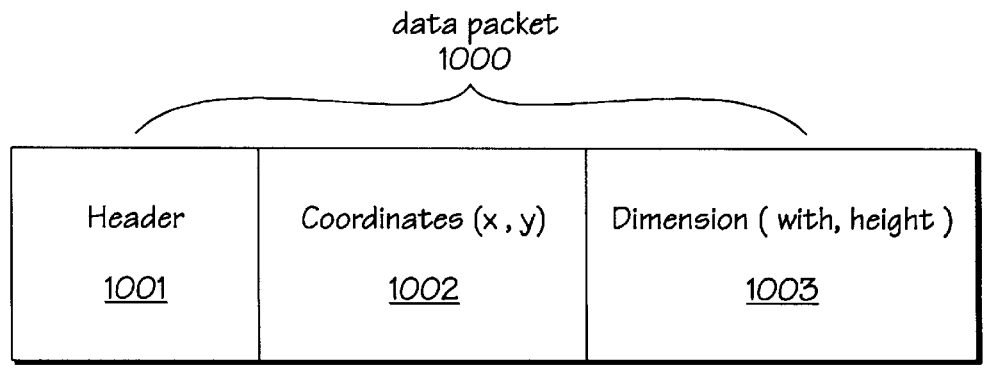
FIG. 10 illustrates one example of a data packet for transmitting coordinate and dimension information.

Using the example of a patent attorney (viewer) and a scientist (displayer) described in the Background section, the flow chart in FIG. 8 in conjunction with FIGS. 4, 9 and 10 describe the first portion of the present invention: the process of identifying the region-of-interest. More specifically, if the viewer is in an audiovisual conference with the displayer and is interested in seeing the displayer's drawings on the white board more clearly, the viewer can first identify the displayer's white board as the region-of-interest (step 801 in FIG. 8). Then with the help of input device 407, the viewer proceeds to draw a rectangle closely around the boundaries of the region-of-interest (step 802). When the rectangle is drawn, a system interrupt is generated (step 803), and some form of a conventional interrupt service routine (ISR) is invoked. During the ISR, certain geometric information of the viewer's chosen rectangle is stored in step 804.

FIG. 9 further illustrates step 804. In particular, the previously mentioned white board, or the region-of-interest, 901 is encompassed by the viewer's drawn rectangle 902. In order to determine the exact location of rectangle 902 in reference to an entire image, at least the horizontal and the vertical coordinates for the four vertices must be established. The preferred embodiment, however, collects and records only two sets of values: the first values being the vertical-horizontal coordinates for the upper most left vertex 903 and the second being the values for width 905 and height 904. With values 903, 904 and 905, the coordinates of the four vertices and consequently the area covered by rectangle 902 can be readily calculated.

In step 805, video decoder 405 packages the newly generated values 903, 904 and 905 into data packets 1000 as illustrated in FIG. 10. Specifically, coordinate information 1002 contains values from vertex 903, and dimension information 1003 consists of values from width 905 and height 904. Additionally, header 1001 contains a predefined set of control directives such as a packet identifier (for example, differentiating between a data packet and a control packet), a packet type identifier (for example, differentiating between a geometric control packet and a flow control packet) and time stamp information. In constructing the data packet with coordinate information 1002 and dimension information 1003, header 1001 activates both its control packet identifier and the geometric type identifier. Video decoder 405 then transmits the resulting data packet to video encoder 402 through back transmission channel 404 in step 806.

Figure 5:
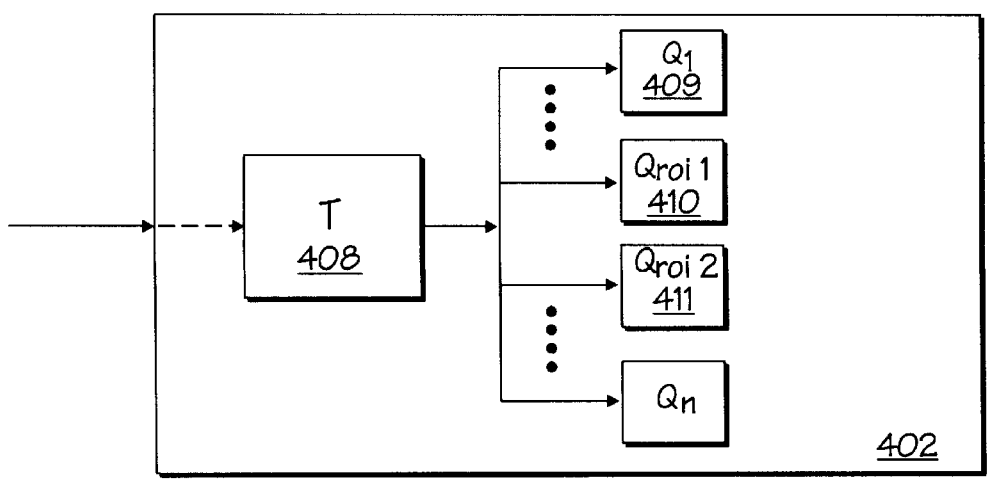
FIG. 5 illustrates some details of video encoder in FIG. 4.
Figure 11:
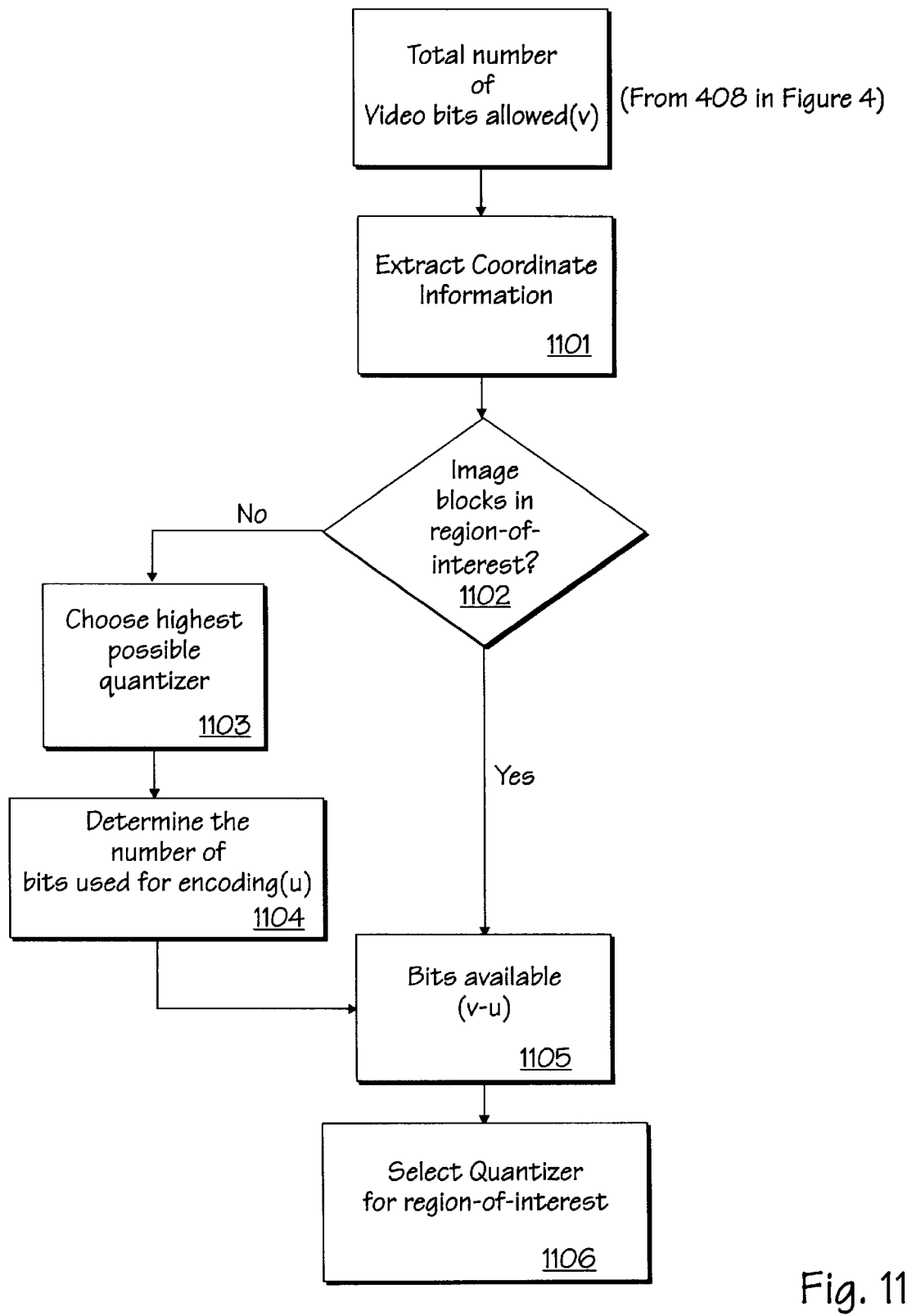
FIG. 11 illustrates a flow chart describing the bit allocation process.

When video encoder 402 receives data packets 1000, the flow chart in FIG. 11 in reference to the block diagrams in FIG. 4 and FIG. 5 unveils the second portion of the present invention: the method of allocating bits. In the preferred embodiment, system control block 408 establishes a number of bits (or known as V) video encoder 402 can use to compress video images. V is calculated based on the available bandwidth and the desired frame rate. The general mathematical relationship is:

V=bandwidth/frame rate or
=(bits/second)/(frame/second)
=bits/frame

In other words, if a fast connection is available or a low frame rate is acceptable in an audiovisual conference, the compressed video information will possess less distortion. On the other hand, if a high frame rate is required but only a slow connection is available, some video information will be lost or corrupted.

After the value of V is determined, video encoder 402 maintains V and proceeds to extract coordinate information 1002 and dimension information 1003 from incoming data packets in step 1101. By comparing the predefined control directives to the ones in header 1001 of each data packet, video encoder 402 is able to identify the appropriate data packets for further processing. After coordinate information 1002 and dimension information 1003 is distilled from these chosen data packets, horizontal and vertical coordinates are derived from these filtered data. Subsequently, the region-of-interest area is calculated from the derived coordinates.

Having established the region-of-interest, video encoder 402 goes on to select image blocks outside the region in step 1102 and perform two-dimensional transform coding on them. After the transform coefficients are formulated, video encoder 402 attempts to choose one appropriate quantizer from a bank of available quantizers such as 410 or 411 illustrated in FIG. 5. In the preferred embodiment of the present invention, the quantizer with the highest possible quantizer step size in the system is always used for areas outside region-of-interest (step 1103). Consequently, although such a condition introduces much distortion and noise for images in the areas, the number of bits required to encode images in such areas decreases substantially.

The relationship between image quality and the required number of bits for processing video information is further discussed in step 1104. Step 1104 involves dividing the transform coefficients by the selected quantizer step size, or (transform coefficients)/(quantizer step size). The number of bits necessary to represent the resulting quotient is then calculated (known as U). As an illustration, if transform coefficient=32 quantizer step size=2 quotient=32/2=16

The number of bits necessary to represent 16=5 bits
However, if transform coefficient still=32 quantizer step size=32 quotient=32/32=1

The number of bits necessary to represent 1=1 bit

As has been demonstrated, the higher the quantizer step size is, the less number of bits is required to represent the resulting quotient. On the other hand, because of the large quantizer step size, small number of allocated bits unavoidably leads to the degradation of image quality.

In step 1105, after having depleted U number of bits to encode areas outside the region-of-interest, the remaining number of bits available for allocation equals to (V–U). Further, step 1106 uses the number (V–U) in deciding on a suitable quantizer Since U has been minimized, the value of (V–U) should produce the maximum number of allowable bits to encode image blocks in a given area. By applying the mathematical relationships established in earlier equations, the resultant quantizer for the region-of-interest will have the most number of steps but with the smallest step sizes. Because small step sizes diminish the discrepancy between the actual video input and the quantized output substantially, the image quality for the interested region will improve noticeably.

In brief, the bits which are normally used to encode image blocks outside the region-of-interest have been reallocated to encode blocks within the region-of-interest. Then the encoded image blocks from different quantizers are transmitted to video decoder 405 through forward transmission channel 403. Referring back to the patent attorney and the scientist example, the likely outcome utilizing the present invention will generate a distinctly sharper image of the white board and a more blurry image of the surroundings of the white board on display terminal 406.

Alternative Embodiment Considerations

Although transform coding is used in describing some embodiments of the present invention, other video compression and decompression schemes can be used without altering the scope of the invention.

Additionally, the discussed method for selecting the region-of-interest involves drawing a rectangle to encompass the region. Other geometric enclosures, such as circles, triangles, or even irregularly shaped enclosures can all be used with similar results. Furthermore, the region-of-interest does not need to be defined by manually operating an input device, such as a mouse. Speech description or even human eye ball movements are some other alternative indicators to help determine the region-of-interest.

Lastly, even though one described embodiment always uses the quantizer with the highest quantizer step size for areas outside of the region-of-interest, other quantizer selection algorithms can be applied without exceeding the spirit of the present invention.

Thus, an improved video encoding scheme for an audio-visual conferencing system has been described. Although the present invention has been described particularly with reference to the figures, it will be apparent to one of the ordinary skill in the art that the present invention may appear in any of a number of other image compression and decompression systems. It is contemplated that many changes and modifications may be made by one of ordinary skill in the art without departing from the spirit and scope of the present invention.

What is claimed is:

1. A method of generating a user selected region-of-interest in detail, the method comprising:

a. translating said user selected region-of-interest by a video decoder into corresponding horizontal and vertical coordinates recognizable by both said video decoder and a video encoder;

b. transmitting said coordinates from said video decoder to said video encoder through a back transmission channel;

c. identifying corresponding transform coefficients and quantizers within said coordinates; and d. taking bits representing video information from regions outside of said coordinates and allocating said bits to said transform coefficients and quantizers.

2. The method according to claim 1, wherein said region-of-interest is selected with an input device.

3. The method according to claim 1, wherein said region-of-interest is defined by drawing a geometric enclosure around said region-of-interest.

4. An apparatus for generating a user selected region-of-interest in detail, the apparatus comprising:

a. means for translating said user selected region-of-interest into corresponding horizontal and vertical coordinates recognizable by both said video decoding means and a video encoding means;

b. means for said video decoding means to send said coordinates to said video encoding means through a back transmission channel;

c. means for identifying corresponding transform coefficients and quantizers within said coordinates; and d. means for taking bits representing video information from regions outside of said coordinates and allocating said bits to said transform coefficients and quantizers.

5. The apparatus according to claim 4, wherein said means for allocating bits further comprises means for identifying corresponding transform coefficients and quantizers within said coordinates, taking bits representing video information from regions outside of said coordinates and allocating said bits to said transform coefficients and quantizers.

6. The apparatus according to claim 4, wherein said region-of-interest is selected with an input device.

7. The apparatus according to claim 4, wherein said region-of-interest is defined by drawing a geometric enclosure around said region-of-interest.

8. An apparatus for generating a user selected region-of-interest in detail, the apparatus comprising:
   a. a video decoder to translate said user selected region-of-interest into corresponding horizontal and vertical coordinates recognizable by both said video decoder and a video encoder;
   b. said video decoder to send said coordinates to said video encoder through a back transmission channel; and
   c. said video encoder to identify corresponding transform coefficients and quantizers within said coordinates, take bits representing video information from regions outside of said coordinates and allocate said bits to said transform coefficients and quantizers.

9. The apparatus according to claim 8, wherein said region-of-interest is selected with an input device.

10. The apparatus according to claim 8, wherein said region-of-interest is defined by drawing a geometric enclosure around said region-of-interest.

11. An audiovisual conferencing system comprising:
   a. a video encoder and a video decoder connected by a forward and a back transmission channel;
   b. a video display terminal;
   c. an input device to allow a user to select a region-of-interest on said display terminal;
   d. said video decoder to translate said selected region-of-interest into corresponding horizontal and vertical coordinates recognizable by both said video decoder and said video encoder; and
   d. said video encoder to identify corresponding transform coefficients and quantizers within said coordinates, take bits representing video information from regions outside of said coordinates and allocate said bits to said transform coefficients and quantizers.

12. The audiovisual conferencing system according to claim 11, wherein said input device is a mouse.

13. The audiovisual conferencing system according to claim 11, wherein said region-of-interest is defined by drawing a geometric enclosure around said region-of-interest.

* * * * *